United States Patent
Boreham et al.

[11] Patent Number: 6,005,478
[45] Date of Patent: Dec. 21, 1999

[54] SIREN UNIT

[75] Inventors: John Anthony Boreham, Carnegie; Scott Herbert Harding, Croydon, both of Australia

[73] Assignee: Robert Bosch GmbH, Stuttgart, Germany

[21] Appl. No.: 08/652,449

[22] PCT Filed: Dec. 6, 1994

[86] PCT No.: PCT/AU94/00754

§ 371 Date: Sep. 5, 1996

§ 102(e) Date: Sep. 5, 1996

[87] PCT Pub. No.: WO95/16248

PCT Pub. Date: Jun. 15, 1995

[51] Int. Cl.$^6$ ...................................................... B60Q 1/00
[52] U.S. Cl. ...................... 340/425.5; 340/426; 340/428; 340/825.32; 307/10.2
[58] Field of Search .................................. 340/426, 428, 340/474, 636, 650, 328, 329, 384.4, 384.71, 404.1

[56] References Cited

U.S. PATENT DOCUMENTS

| | | | |
|---|---|---|---|
| 3,882,275 | 5/1975 | Carroll | 340/384.71 |
| 4,885,572 | 12/1989 | Iwata et al. | 340/425.5 |
| 5,012,221 | 4/1991 | Neuhaus et al. | 340/384.71 |
| 5,148,145 | 9/1992 | Tsao | 340/429 |
| 5,278,537 | 1/1994 | Carlo et al. | 340/384.1 |
| 5,287,099 | 2/1994 | Tsunoda | 340/825.44 |
| 5,296,840 | 3/1994 | Gieffers | 340/474 |
| 5,332,994 | 7/1994 | Kawashima et al. | 340/825.44 |

FOREIGN PATENT DOCUMENTS

| | | |
|---|---|---|
| 35316/78 | 10/1979 | Australia . |
| 18164/88 | 8/1989 | Australia . |
| 41742/89 | 4/1990 | Australia . |
| 63192/90 | 3/1992 | Australia . |
| 0401322 | 12/1992 | European Pat. Off. . |
| 0520906 | 12/1992 | European Pat. Off. . |
| 0559554 | 9/1993 | European Pat. Off. . |
| 2346788 | 10/1977 | France . |
| 2 678 410 A1 | 12/1992 | France . |
| 2 694 531 B1 | 10/1994 | France . |
| 3812144 | 10/1989 | Germany . |
| 3823824 | 10/1989 | Germany . |
| 4114535 | 12/1991 | Germany . |
| 2124417 | 2/1984 | United Kingdom . |
| 2184277 | 6/1987 | United Kingdom . |
| 2256775 | 12/1992 | United Kingdom . |
| 2272337 | 5/1994 | United Kingdom . |
| 82/02971 | 9/1982 | WIPO . |
| 92/10387 | 6/1992 | WIPO . |
| 92/20049 | 11/1992 | WIPO . |
| 94/26567 | 11/1994 | WIPO . |

OTHER PUBLICATIONS

Derwent Abstract Accession No. 89–098838/13, Class W05, SU, A, 1425747 (Vekshtein M.L.), Sep. 23, 1988.
Derwent Abstract Accession No. 87–190352/27, Class P86, SE, A, 8504320 (Ulkveco Kockum Sonic), Mar. 19, 1987.

*Primary Examiner*—Jeffery A. Hofsass
*Assistant Examiner*—Daryl C. Pope
*Attorney, Agent, or Firm*—Venable; George H. Spencer; Norman N. Kunitz

[57] ABSTRACT

A siren unit including control means for controlling activation of a siren loudspeaker (8) at a selected frequency based on a frequency control signal, and input means for providing the frequency control signal to the control means. The input means further provides a volume control signal and a duration control signal. The siren loudspeaker (8) is activated in response to a trigger signal received by the input means which may be a plurality of predetermined data bits. The siren loudspeaker (8) can be activated on the basis of a data communications packet received and provided by the input means. The siren loudspeaker (8) is also activated when the data communications packet is not received.

23 Claims, 15 Drawing Sheets

SIREN UNIT

BACKGROUND OF THE INVENTION

The present invention relates to a siren or alarm unit, and in particular a siren or alarm unit which can be used with vehicle security systems.

Vehicle security systems may include sirens which are activated by the system when an alarm condition occurs, such as unauthorised or forced entry to a vehicle. The units which drive the siren are normally configured to generate a predetermined siren signal of a set volume and duration. The frequency of activation of the siren may also be set, and in some instances the frequency is varied during the period of activation in accordance with a set frequency or sound pattern.

Rigid setting of the frequency, volume and duration is disadvantageous as regional authorities have established different detailed specifications which place controls of the frequency, volume and duration for use of vehicle sirens. For example, an authority may specify maximum and minimum frequencies which can be used, or limits on the predominate frequency, for any vehicle siren signals generated. This means that different siren units have to be manufactured for each region, country or state depending on the authority's requirements. These requirements or regulations then need to be taken into account to ensure the correct siren unit is installed in a vehicle, and attention paid to the likely region, country or state in which the vehicle will be used. This still, of course, does not overcome the problem of a vehicle owner breaching a local authority's regulations when the vehicle's siren is activated in another region, country or state from that which it is normally driven in.

SUMMARY OF THE INVENTION

In accordance with the present invention there is provided a siren unit including control means for controlling activation of a siren sound emitting means at a selected frequency based on a coded frequency control signal; and input means for receiving said coded frequency control signal from a vehicle security control unit and providing it to said control means.

The present invention also provides an alarm unit including:

control means for controlling activation of loudspeaker means in response to an alarm signal and a sound control signal; and input means for providing said sound control signal and said alarm signal to said control means;

said control means storing a predetermined set of sound signals, whereby said control means selects one of said sound signals in response to said sound control signal and, when said alarm signal is received, causes said loudspeaker means to generate sound in accordance with the selected sound signal.

The present invention further provides an alarm unit including: control means for controlling activation of loudspeaker means in response to a data communications packet; said control means being connected to a vehicle security control unit; input means for receiving said data communications packet from the vehicle security control unit and providing it to said control means; said control means storing a predetermined set of sound signals, whereby said control means selects one of said sound signals in response to sound control information contained in said data communications packet and causes said loudspeaker means to generate sound in accordance with the selected sound signal when an alarm condition is indicated, whereby an alarm condition is indicated when said data communications packet is not received by said input means.

The present invention also provides a siren unit including: control means for controlling activation of a siren sound emitting means based on a data communications packet, said data communications packet containing information about the frequency pattern of a sound to be emitted; and input means for receiving said data communications packet from a vehicle security control unit and providing it to said control means.

BRIEF DESCRIPTION OF THE DRAWINGS

A preferred embodiment of the present invention is hereinafter described, by way of example only, with reference to the accompanying drawings, wherein.

DETAILED DESCRIPTION OF THE PREFERRED EMBODIMENTS

Figure 1:
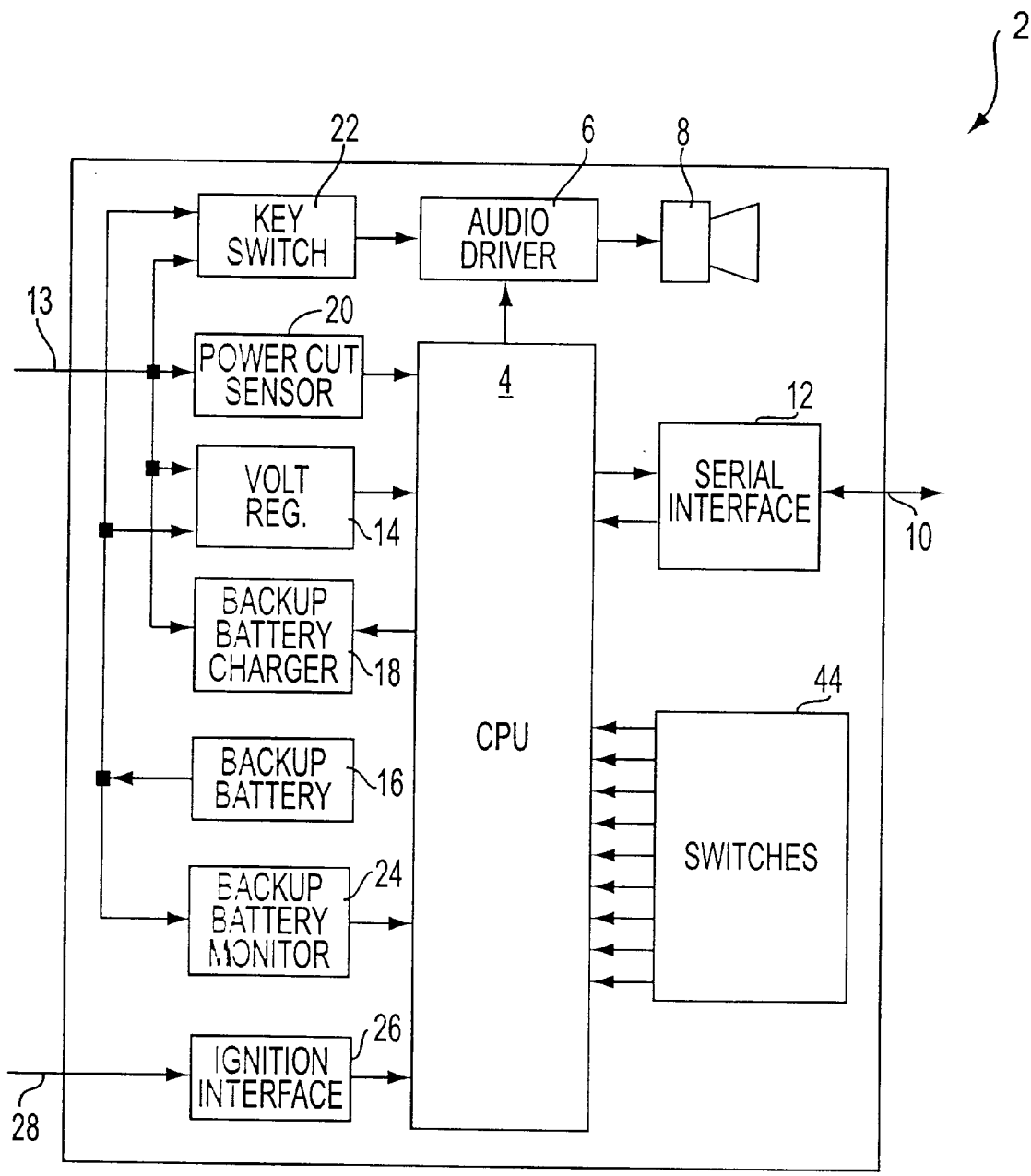
FIG. 1 is a block diagram of a preferred embodiment of a siren unit.
Figure 2:
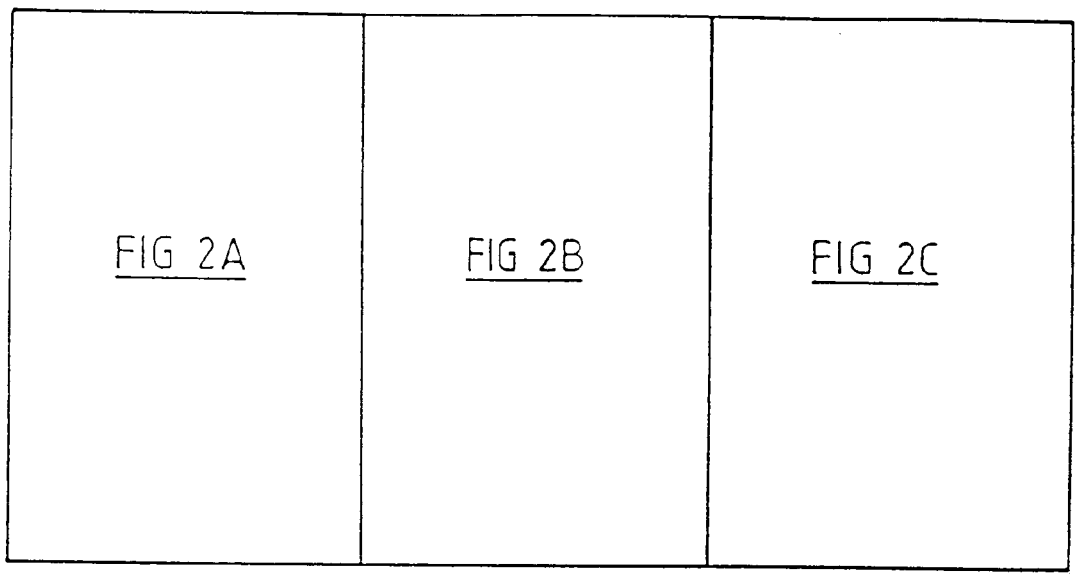
FIGS. 2–2C are circuit diagrams of the siren unit of FIG. 1.
Figure 2A:
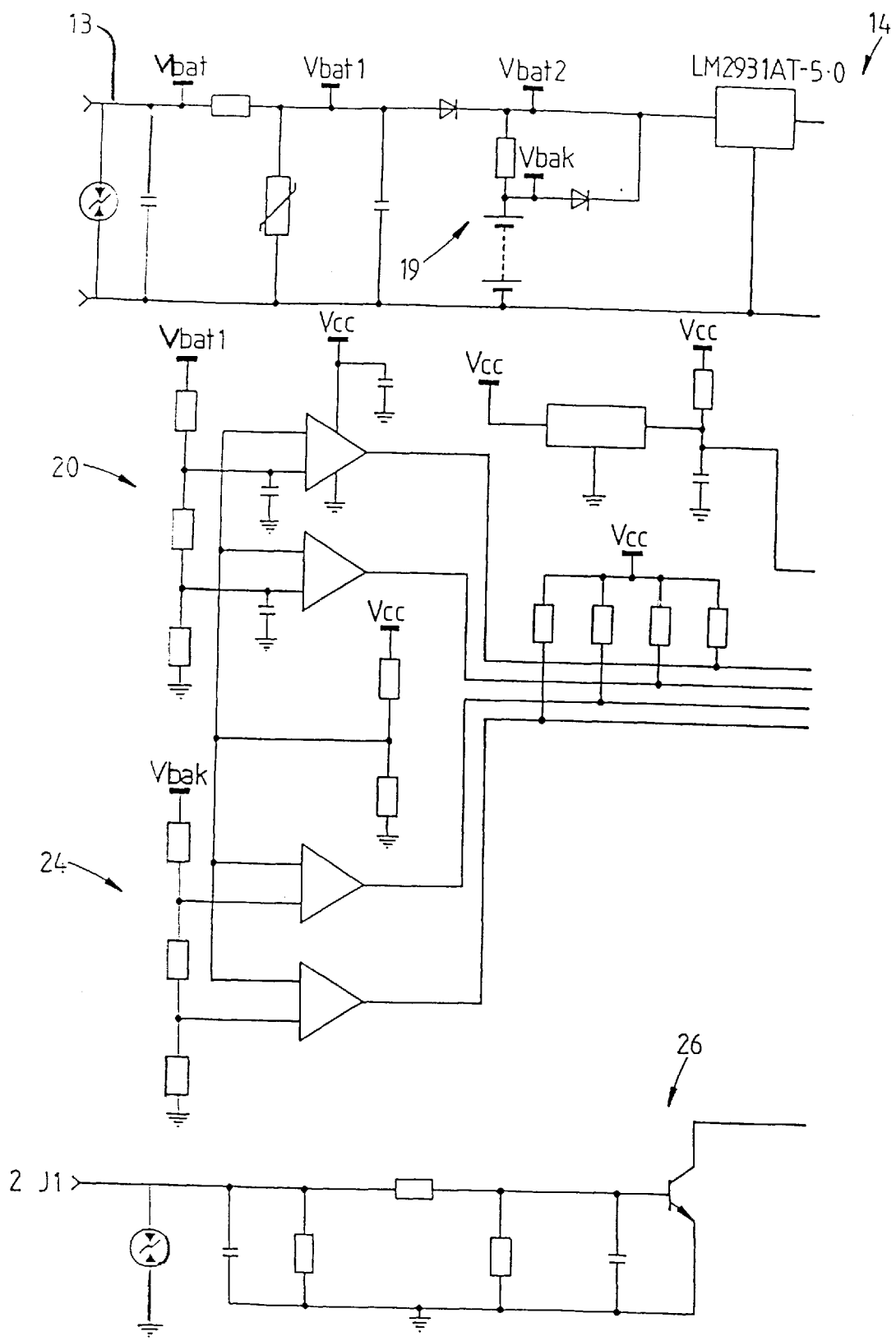
Figure 2B:
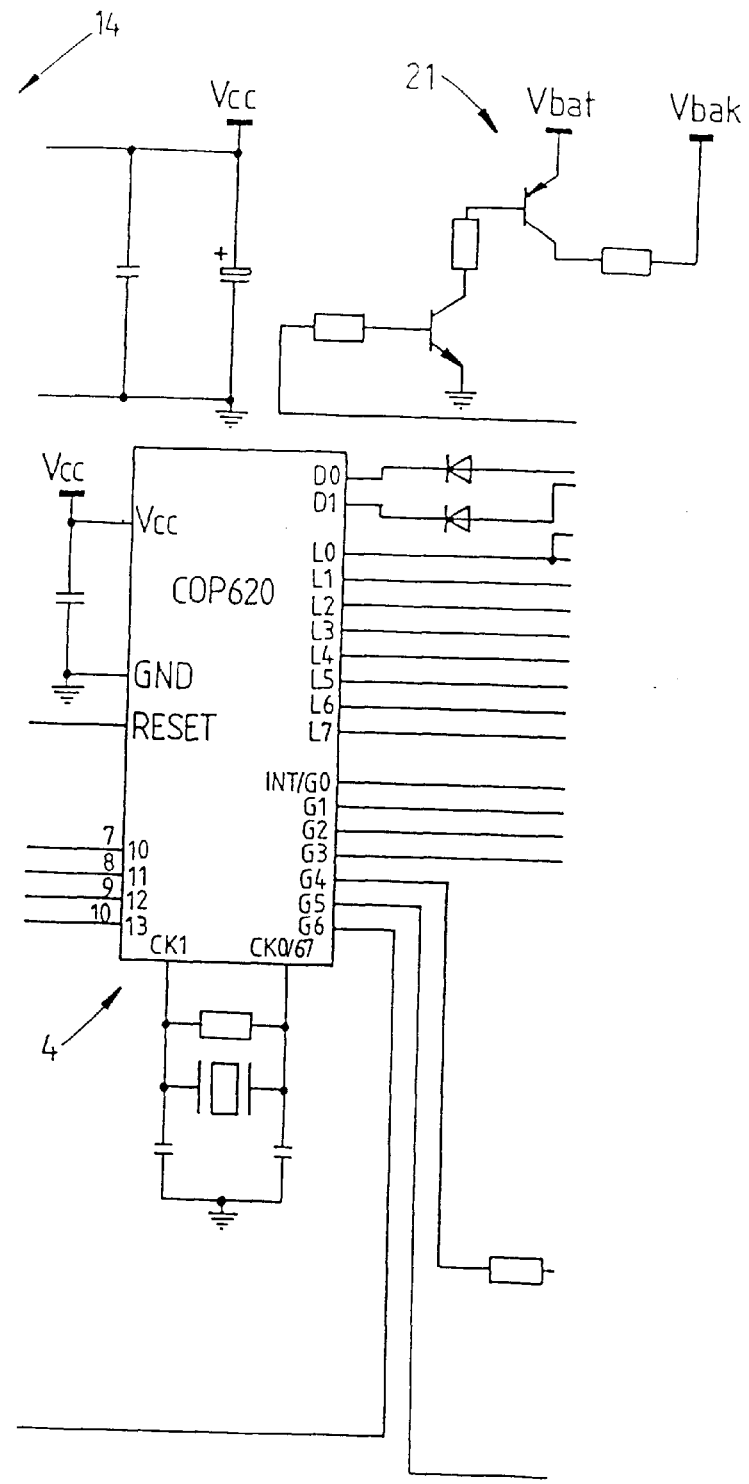
Figure 2C:
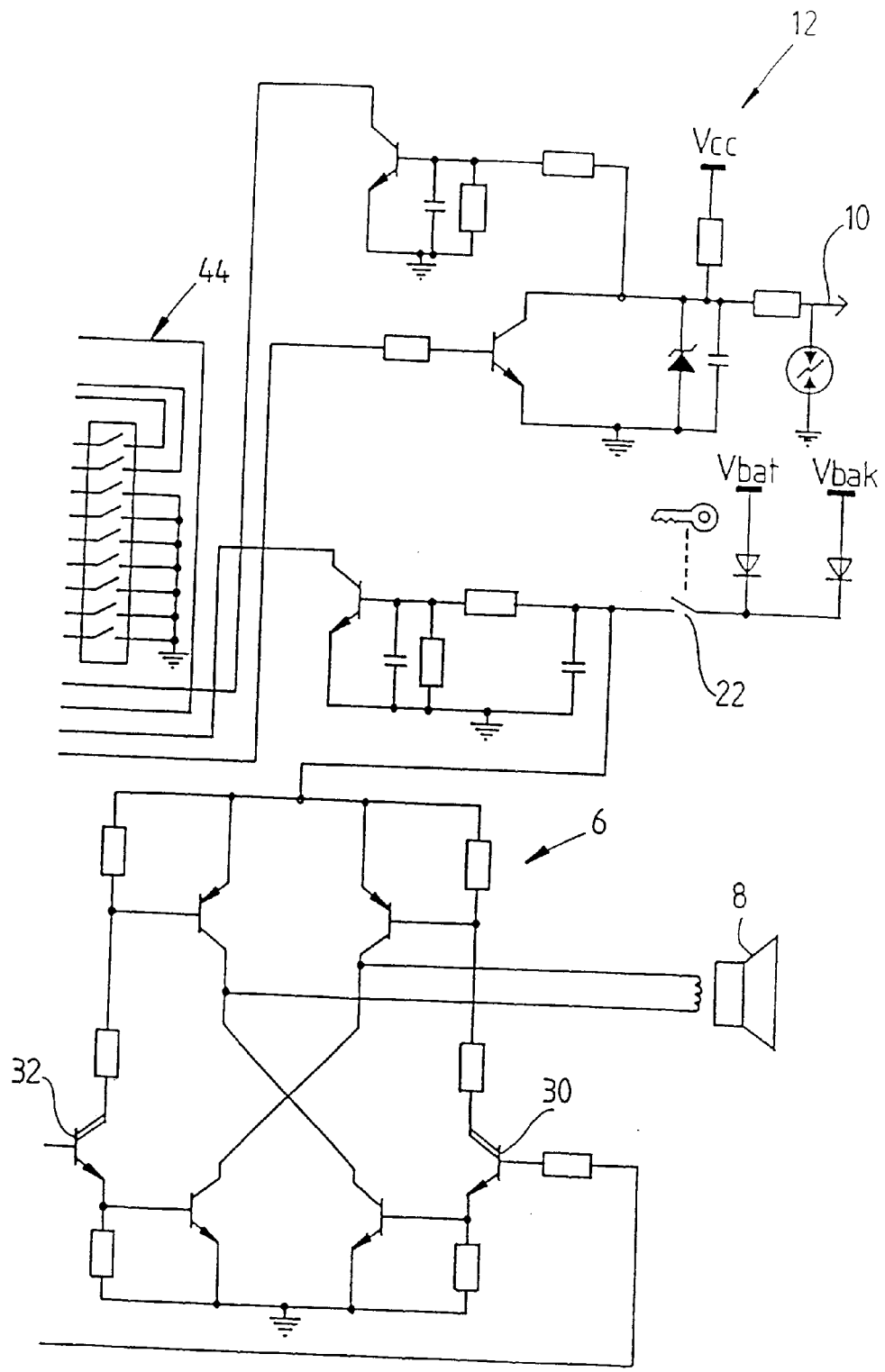

A siren unit 2, as shown in FIGS. 1 and 2, includes a central processing unit (CPU) 4, an audio driver 6 and a siren loudspeaker 8. The siren loudspeaker 8 is designed for emitting siren sounds in the frequency range 2500 to 3500 Hz but can also be used to emit sounds of other audible frequencies. The CPU 4 is configured so as to provide activation signals to the audio driver 6 so the driver 6 can drive the siren 8, in response to a trigger signal received on a control input 10. The control input 10 is connected to the CPU by a serial interface 12. The control input 10 may be connected to a vehicle security control unit which is able to monitor the vehicle, determine when an alarm condition occurs, and issue the appropriate trigger signal.

The siren unit 2 may be powered by a vehicle battery connected to a battery input 13, the vehicle battery voltage then being regulated by a voltage regulator circuit 14 so as to provide a supply voltage $V_{CC}$ for the CPU 4 and other parts of the unit 2. The siren unit 2 has a backup battery 16 which is used to power the unit and provide the supply voltage $V_{CC}$ in the event that supply from the vehicle battery is disconnected or cut. The backup battery 16 is charged by a battery backup charger 18 which includes a trickle charging circuit 19 and a fast charging circuit 21.

A power cut sensor circuit 20 is included which is able to detect when the power supply from the vehicle battery is disconnected and thereby cause the CPU 4 to activate the siren 8. The power cut sensor 20 is able to discriminate between slow discharge of the supply provided on the battery input 13 and disconnection of the supply. A key switch 22 is provided to enable the siren unit 2 to be switched on and off as desired by the possessor of a key for the switch 22. Opening of the key switch 22 disables the audio driver 6. This allows the battery to be disconnected during maintenance or service of the vehicle or siren unit 2.

A backup battery monitor circuit 24 is included which is able to monitor the state of the backup battery and report to the CPU 4. This enables the siren unit 2 to issue a signal indicating the voltage which can be provided by the backup battery 16 is not sufficient. The siren unit 2 also includes an ignition interface 26 which has a ignition input 28 for connection to the ignition line of a vehicle. The ignition interface 26 is able to detect when ignition power has been enabled in the vehicle and report to the CPU 4. This allows the CPU 4 to selectively enable the trickle charging circuit 19 or the fast charging circuit 21 depending on whether ignition power is being provided to the motor of the vehicle.

Figure 3A:
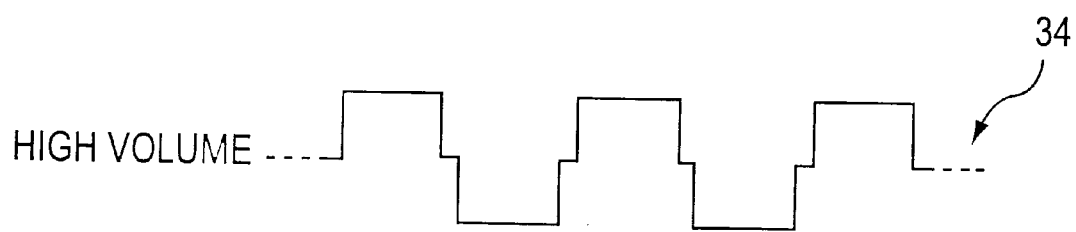
FIG. 3 is a schematic diagram of voltage pulses used to control an audio driver of the siren unit.
Figure 3B:
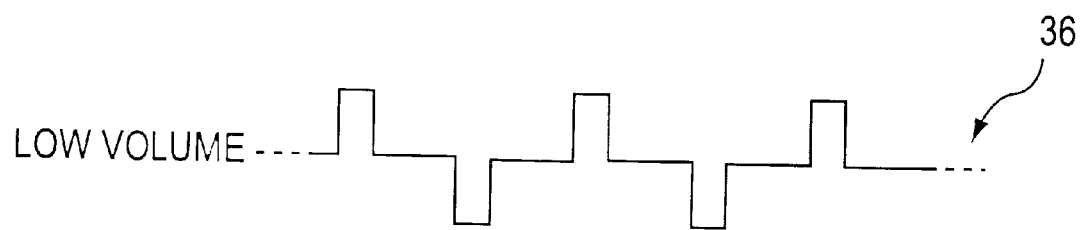

The audio driver 6 comprises a H-bridge transistor circuit, as shown in FIG. 2, which is activated by two voltage pulse signals of opposite polarity generated by the CPU 4 on respective inputs of transistors 30 and 32. The H-bridge 6 is able to drive the inputs of the siren 8 between a high and low voltage range corresponding to the voltage of the vehicle battery as the transistors 30 and 32 are sequentially activated in response to the opposite pulses provided on the inputs of the transistors 30 and 32. The volume of the signal generated by the siren 8 can therefore be controlled by varying the width of the voltage pulses used to activate the audio driver 6. FIG. 3 shows a high volume voltage pulse signal 34 which may be input on one of the transistors 30 or 32 and a low volume voltage pulse signal 36. The signal input on the other transistor 32 or 30 would have the same shape and synchronisation but be of the opposite polarity. The duration or period of activation of the siren corresponds to the time period for which the voltage pulse signals are provided to the audio driver 6.

Figure 4A:
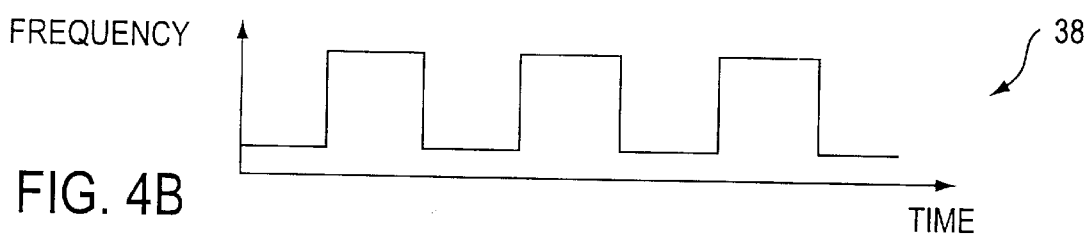
FIG. 4 is a diagram of frequency patterns for controlling the frequency of activation of the audio driver.
Figure 4B:
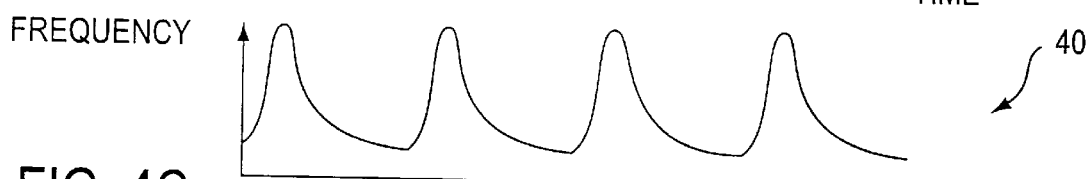
Figure 4C:
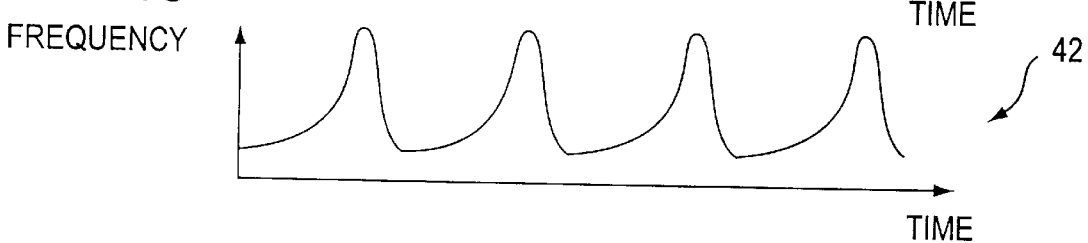

The frequency of activation of the siren 8 during the selected duration may also be controlled by varying the frequency of the voltage pulses 34, 36, i.e., by varying the time period between successive high or low pulses in the activation signals for the driver 6. The frequency can be continuously varied in accordance with a frequency or sound pattern which is stored in the CPU 4. The CPU 4 may store a number of sound patterns which are chosen so as to meet frequency restrictions which may be imposed by regulatory authorities for a region, state or country. Three examples of sound patterns which may be used and stored in the CPU 4 are shown in FIG. 4. The first sound pattern 38 simply involves varying the frequency of the activation signals periodically between a high and low frequency whereas the second and third patterns 40 and 42 involve a more gradual variation of the frequency of the activation signals to a peak frequency. The sound patterns 30 to 42 will cause the siren 8 to generate distinctive siren signals.

The frequency pattern, volume and duration which the CPU 4 uses when activating the audio driver 6 in response to a trigger signal is determined by either signals received on the serial interface 12 from the vehicle security control unit or the state of a set of nine "dip" switches 44 connected to the CPU 4. Table 1 below specifies the instruction conveyed to the CPU 4 for each state of the switches 44.

TABLE 1

| Switch No. | Description | Switch Status | | Configuration |
|---|---|---|---|---|
| 1 | Trigger Input/ Serial Interface | On Off | | Trigger Input Serial Interface |
| 2 | Active High Trigger/ Active Low Trigger | On Off | | Active High Trigger Active Low Trigger |
| 3 | Power Cut Detect Enable/Disable | On Off | | Power Cut Detect Enable Power Cut Detect Disable |
| 4 & 5 | Alarm Duration | bit4 | bit5 | |
| | | Off | Off | 1 Minute Alarm Duration |
| | | Off | On | 2 Minute Alarm Duration |
| | | On | Off | 3 Minute Alarm Duration |
| | | On | On | 4 Minute Alarm Duration |
| 6 & 7 | Alarm Volume | bit6 | bit7 | |
| | | Off | Off | 105dBA/1m |
| | | Off | On | 110dBA/1m |
| | | On | Off | 115dBA/1m |
| | | On | On | 120dBA/1m |
| 8 & 9 | Sound Type | bit8 | bit9 | |
| | | Off | Off | Sound Pattern 1 |
| | | Off | On | Sound Pattern 2 |
| | | On | Off | Sound Pattern 3 |
| | | On | On | Sound Pattern 4 |

Figure 5A:
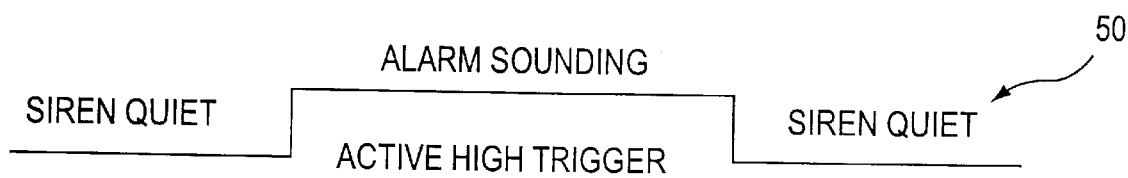
FIG. 5 is a diagram of trigger signals for the siren unit.
Figure 5B:
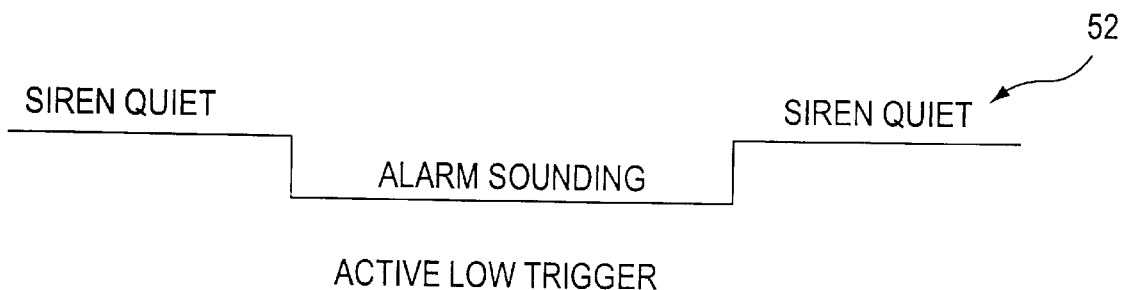

The state of the first switch indicates whether the siren unit 2 will be triggered by the contents of a control data packet received by the serial interface 12 or a trigger signal 50 or 52 on the control input 10, as shown in FIG. 5. If serial interface control is disabled by switching off switch 1 then switch 2 will indicate whether the CPU 4 needs to look for a high trigger signal 50 to activate the siren 8 or a low trigger signal 52 to activate the siren 8. The ability to trigger the siren 8 on the basis of a control packet received by the serial interface 12 or high or low trigger signals 50 or 52 is provided to ensure the siren unit 2 is compatible with different types of triggering used by vehicle security control units. A vehicle security control unit developed by the applicant is able to generate appropriate control packets to trigger the siren 8 by the serial interface 12.

The siren unit 2 is configured so that if the control input 10 is disconnected or cut, whilst the unit 2 is enabled, the unit 2 will trigger the siren 8. If serial interface control is disabled, the interface 12 will be pulled high or low, corresponding to the level of the trigger signal 50 or 52, when the control input 10 is disconnected so as to trigger the siren 8. This introduces a further level of security to the unit 2 which can only be defeated if the control input 10 is disconnected and simultaneously maintained low or high so as to prevent the interface 12 detecting a voltage difference and passing a trigger signal to the CPU 4. If serial interface control is enabled, the security of the siren unit 2 is enhanced even further. To prevent the siren 8 from triggering, the CPU 4 must continuously or regularly receive a control packet from the vehicle security control unit which prevents the siren 8 from being activated. Whilst a thief may be able to provide the correct voltage level to the interface 12 when disconnecting the input 10, and it is highly unlikely that a thief would be able to provide the correct serial code of the control packet, which as described below, may comprise 24 bits, to prevent the siren 8 being activated on disconnection.

When the trigger input looks to the high or low trigger signals 50 or 52, the duration, volume and sound pattern used by the CPU 4 is determined by the state of the fourth to ninth switches 44 as specified in Table 1. The siren 8 will remain activated during the period of the high or low trigger signal 50 or 52 unless the chosen alarm duration expires first.

Figure 6:
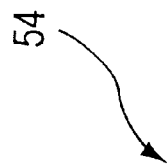
FIG. 6 is a diagram of the format of a serial communications packet for the siren unit.

Switching the first switch of the dip switches 44 to "off" enables the CPU 4 and the siren unit 2 to be controlled by 24 bit serial control packets 54, as shown in FIG. 6. The packet format 54 is used by the CPU 4 to receive instructions from a vehicle security control unit on the control input 10 and also to send information to the vehicle security control unit. The CPU 4 receives a control packet 54 from the vehicle security control unit every one second and if a valid control packet 54 is not received the CPU 4 activates the siren 8. The information represented by each bit of the serial data packet

| Bit No. | Description | Bit Status | | Configuration |
|---------|-------------|------------|------|---------------|
| 0..3 | Address Field | 0001 | | Siren Address |
| 4..7 | Spare | — | | — |
| 8 | Spare | — | | — |
| 9 | Power Cut Detect Enable/Disable | 1 | | Power Cut Detect Enable |
| | | 0 | | Power Cut Detect Disable |
| 10, 11 | Alarm Duration | bit10 | bit11 | |
| | | 0 | 0 | 1 Minute Alarm Duration |
| | | 0 | 1 | 2 Minute Alarm Duration |
| | | 1 | 0 | 3 Minute Alarm Duration |
| | | 1 | 1 | 4 Minute Alarm Duration |
| 12, 13 | Alarm Volume | bit12 | bit13 | |
| | | 0 | 0 | 105dBA/1m |
| | | 0 | 1 | 110dBA/1m |
| | | 1 | 0 | 115dBA/1m |
| | | 1 | 1 | 120dBA/1m |
| 14, 15 | Sound Type | bit14 | bit15 | |
| | | 0 | 0 | Sound Pattern 1 |
| | | 0 | 1 | Sound Pattern 2 |
| | | 1 | 0 | Sound Pattern 3 |
| | | 1 | 1 | Sound Pattern 4 |
| 16 | Trigger Alarm/Shut Off Alarm | 1 | | Trigger Alarm |
| | | 0 | | Shut Off Alarm |
| 17 | Reset Alarm Timer/Continue Timer | 1 | | Reset Alarm Timer |
| | | 0 | | Continue Alarm Timer |
| 18 *Note 1 | Backup Battery Status Request | 1 | | Backup Battery Request |
| | | 0 | | No Request |
| 18 *Note 2 | Backup Battery Status | 1 | | Backup Battery Flat |
| | | 0 | | Backup Battery OK |
| 19 | Backup Charging Status | 1 | | Fast Charging Backup |
| | | 0 | | Trickle Charging Backup |
| 20 | Siren Status | 1 | | Alarm Sounding |
| | | 0 | | Siren Quiet |
| 21 | Vehicle Battery Connection Status | 1 | | Battery Connected |
| | | 0 | | Battery Disconnected |
| 22 | Ignition Status | 1 | | Ignition On |
| | | 0 | | Ignition Off |
| 23 | Key Switch Status | 1 | | Key Switch On |
| | | 0 | | Key Switch Off |

*Note 1: Data received by the siren.
*Note 2: Date transmitted by the siren.

Bits 10 to 15 are used for alarm duration, volume and sound pattern selection, as discussed previously. This allows the vehicle security control unit to select between four siren frequency or sound patterns, four volumes and four siren durations as desired. Of course, further options can be simply provided by increasing the number of bits available for siren configuration and storage capacity of the CPU 4, if necessary. The ultimate selection made by the vehicle security control unit can be based on a number of factors. The vehicle security control unit when installed may include a vehicle type, code or country code which indicates where the vehicle is most likely to be driven and the control unit can then make a siren configuration selection on the basis of that code. Alternatively, the vehicle may include a positioning system, such as a Global Positioning System (GPS), and on the basis of information provided by the positioning system, the vehicle security control unit can instruct the siren unit 2 to select a siren frequency, duration and volume which is the most suitable for the vehicle's current position. Vehicle instrument clusters also tend to include a vehicle type or country code and this code can be provided to the vehicle's security control unit as a basis for determining the correct siren configuration to be set for the siren unit 2.

Figure 7:
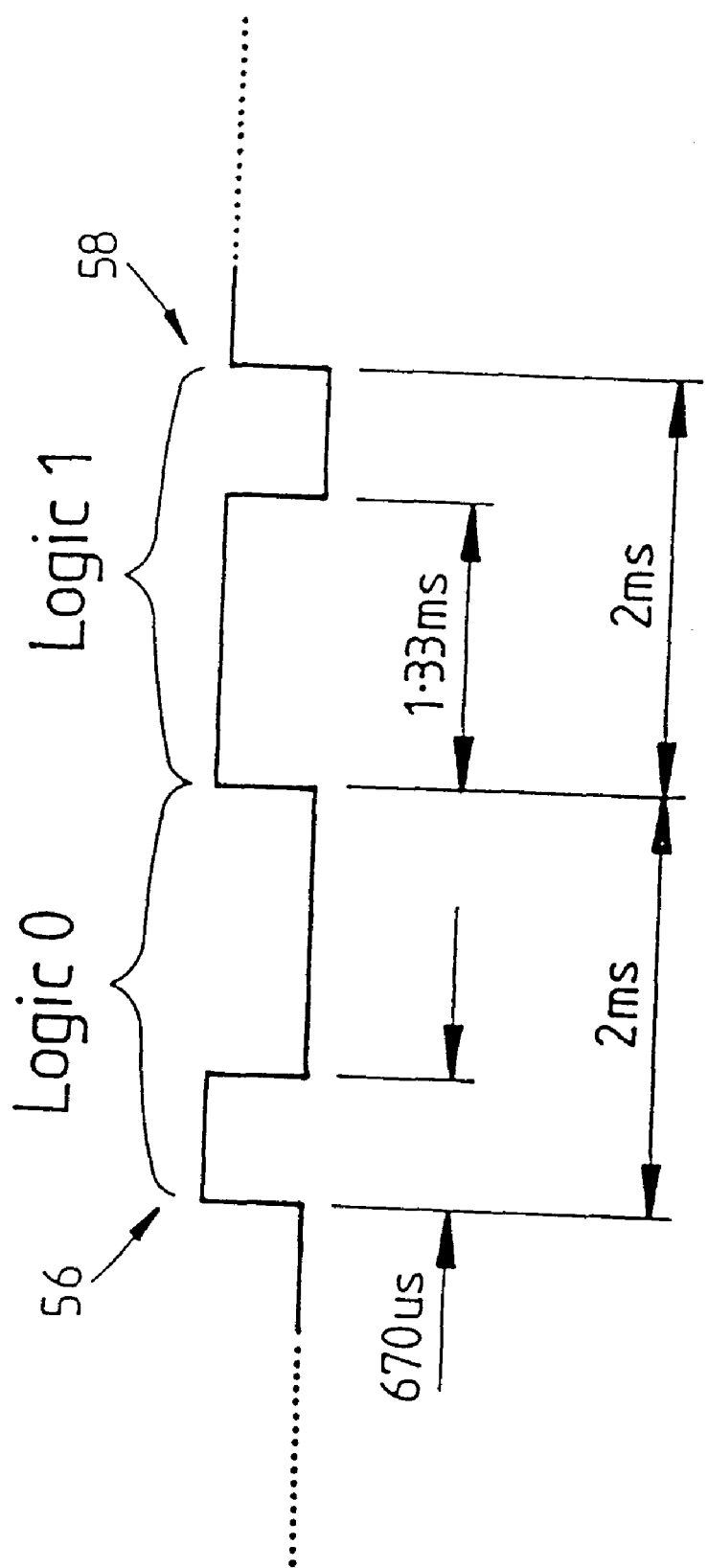
FIG. 7 is a diagram illustrating high and low bits of serial data of the communications packet.

The siren configuration data can be updated each time the vehicle security control unit communicates with the siren unit 2 via the serial interface 12. An address field of 4 bits is provided so the vehicle security control unit can address devices other than the siren unit 2 on a single serial data bus. The data is preferably transferred at 500 baud which gives the packets 54 a period of 48 ms. The length of each bit is therefore 2 ms and pulse width modulation is used to encode each bit such that the duty cycle determines whether the bit is a low bit 56 or a high bit 58, as shown in FIG. 7.

The CPU's 4 response to detection of power disconnection by the power cut sensor 20 can be enabled or disabled, as shown in Tables 1 and 2. The response may be disabled to allow the vehicle battery to be disconnected during servicing or maintenance of a vehicle. When enabled, if disconnection of power supply from the battery input 13 is detected by the sensor 20 and the siren 8 is currently silent, the CPU 4 will then generate the appropriate activation signals selected on the basis of the current siren configuration so as to cause the audio driver 6 to sound the siren 8. Power is supplied to the CPU 4 and the other components by the backup battery 16, which may be a 7.2 volt nickel cadmium battery. The backup battery 16 will also continue to provide power when supply to the battery input 13 is disconnected and the siren 8 is currently activated so as to ensure the siren continues to operate at the configured volume, frequency and duration.

False triggering of the siren 8 by the power cut sensor 20 by flat vehicle batteries is prevented by monitoring the rate of decrease in the supply voltage on the input 13. The power cut sensor 20 provides a trigger signal for the CPU 4 if the voltage on the battery input 13 decreases from 8 to 6 volts in less than one second. If voltage supply decreases from 8 to 6 volts in greater than one second, i.e., as would be the case for slow battery discharge, the power sensor 20 does not provide a trigger signal for the CPU 4. This enables the power cut sensor 20 to discriminate between slow battery discharge and unauthorised disconnection of the battery.

The trickle charge circuit 19 provides a trickle charge current to the backup battery 16 so as to charge the backup battery 16 without discharging the vehicle battery. The trickle charge current does not overcharge the backup battery 16 and is safe for use for indefinite charging periods. A faster charging current is provided by the fast charge circuit 21 when the CPU 4 receives a signal from the ignition interface 26 indicating that the ignition input 28 is high. The fast charging circuit 21 is disabled, to prevent overcharging, when the backup battery monitor circuit 24 detects that the backup battery voltage is greater than 9 volts. Nickel cadmium batteries are not suitable for charging at very high and very low temperatures, and therefore a temperature sensor may be included in the siren unit 2 which would cause the fast charging circuit 21 to be disabled when the sensor temperature is too high or too low. Battery life can thereby be prolonged, particularly in regions which regularly experience very high or very low temperatures.

The backup battery monitor circuit 24 is able to detect when the backup battery is flat, i.e. at a voltage less than 6 volts. The vehicle security control unit can also request, using bit 18 of the communications packet 54, a report on the backup battery status, and the CPU 4 then performs a flat battery test using the backup battery monitor 24. A load is applied to the backup battery 16 for 1 s while the battery voltage is checked using the monitor circuit 24. If the backup voltage exceeds 6 volts then the CPU 4 reports, using bit 18, that the backup battery is satisfactory, otherwise the CPU reports that it is flat. On receiving the flat backup battery status, the vehicle security control unit may generate a warning signal to the vehicle driver, for example, by causing an LED on the instrument panel of the vehicle to flash. The CPU 4 is also able to report, using the serial interface 12, other status information on the state of its components and inputs using bits 19 to 23 as shown in Table 2.

Figure 8:
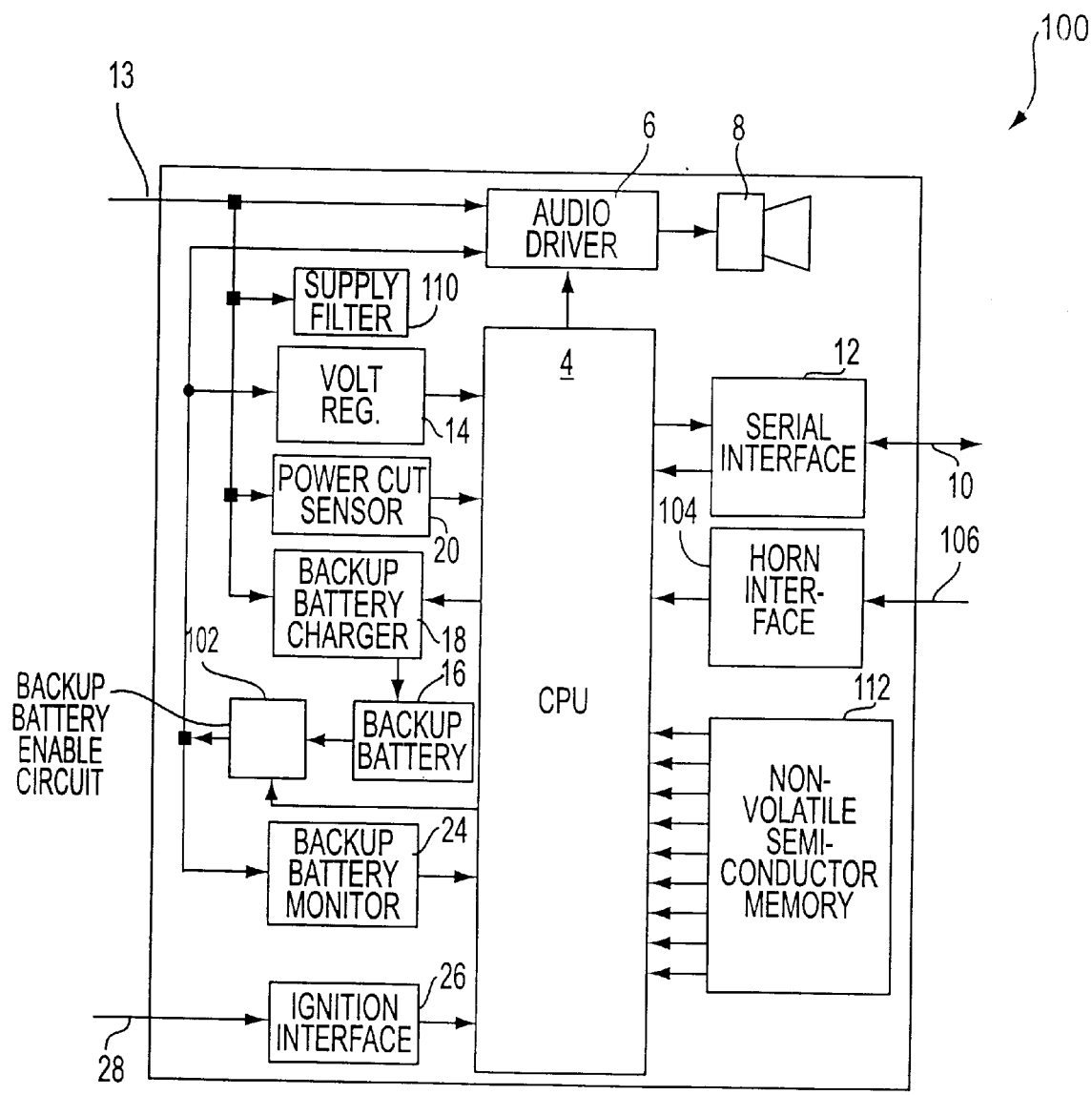
FIG. 8 is a block diagram of a further preferred embodiment of a siren unit.

An alternative siren unit 100, as shown in FIG. 8, is essentially the same as the siren unit 2 described previously but includes additional features and omits other features of the siren unit 2 as discussed below.

The key switch 22 is effectively replaced by a backup battery enable circuit 102 which is controlled by the CPU 4. The enable circuit 102 is connected between the backup battery 16 and the components which the battery 16 supplies power to, and is enabled when the siren unit 100 receives power from the vehicle battery on the line 13. In response to instructions, received via the control input 10, that the siren unit 100 is to be disabled, such as for maintenance, the CPU 4 issues a signal to disable the battery backup enable circuit 102 so that the backup battery 16 can not act to power the unit 100. This allows the unit 100 to be serviced or maintained without the siren 8 sounding on disconnection of the power supply to the battery input 13. If serial interface control is enabled, one of the bits in the control packet can be used to instruct the CPU 4 to disable the battery backup enable 102. If serial interface control is disabled, the vehicle security control unit could pass a coded series of high and low voltage signals on the control input 10 to the CPU 4. For example, a user may enter a four digit code which is acknowledged by the vehicle security control unit by moving an ignition key into and out of the ignition position on an ignition lock of a vehicle in a predetermined sequence.

If serial interface control is enabled, the siren unit 100 may also omit the ignition interface 26 as the vehicle's security control unit can be used to monitor the state of the ignition line 28 and report using the control packet to the CPU 4.

The siren unit 100 further includes a horn interface circuit 104 connected to the CPU 4 and which receives activation signals on a horn switch input line 106 from the horn switch of a vehicle. With the horn interface 104 and the horn switch input 106 connected, a vehicle including the siren unit 100 does not require a horn. On depressing the horn switch, an activation signal is provided on the input 106 to the interface 104 which instructs the CPU 4 to access an appropriate sound pattern for a vehicle horn. The sound pattern is used by the CPU 4 to control the audio driver 6 so as to cause the siren loudspeaker 8 to emit the sound of a vehicle horn, which is normally at a frequency of about 450 Hz. Inclusion of the horn interface 104 and the input 106, with the control software of the CPU 4 altered accordingly, allows a manufacturer to save on the cost of a vehicle horn and relay. The siren unit 100 will sound the horn sound in response to activation of the horn switch, regardless of the state of the remaining components and alarm features of the siren unit 100, provided the vehicle battery power supply 13 is connected.

Further variations which the siren unit 100 includes is the use of a supply filter 110 between the vehicle battery input 13 and the voltage regulator 14 so as to protect the regulator from voltage transients and peaks on the battery input 13. The unit 100 also includes a non-volatile semiconductor memory 112 which may be used instead of the "dip" switches 44 to include bits of data which can provide the same instructions to the CPU 4 as the state of the switches, in accordance with the control allocations set out in Table 1.

Figure 9:
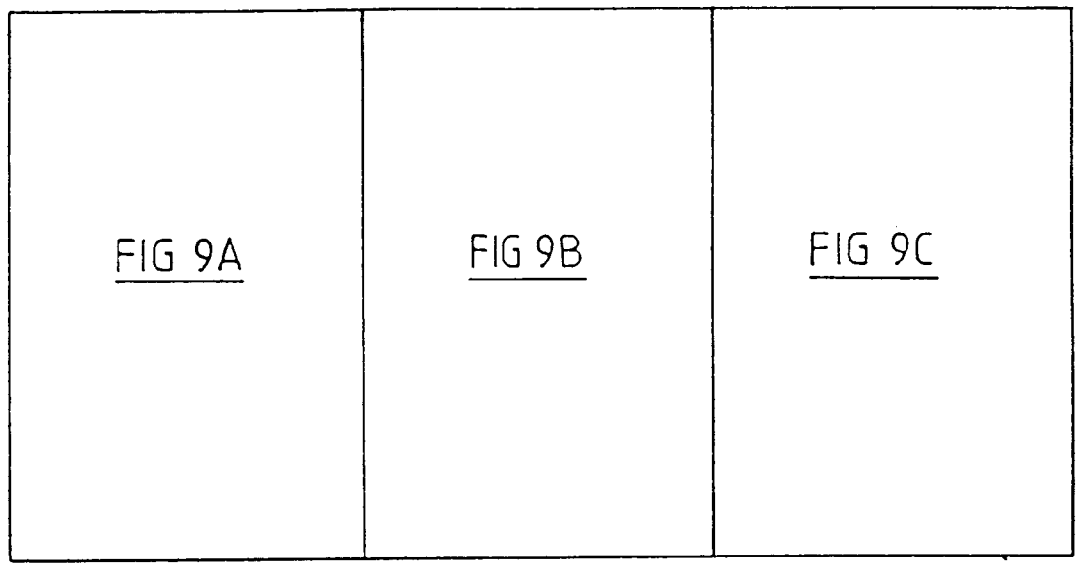
FIGS. 9–9C are circuit diagrams of the siren unit of FIG. 8.
Figure 9A:
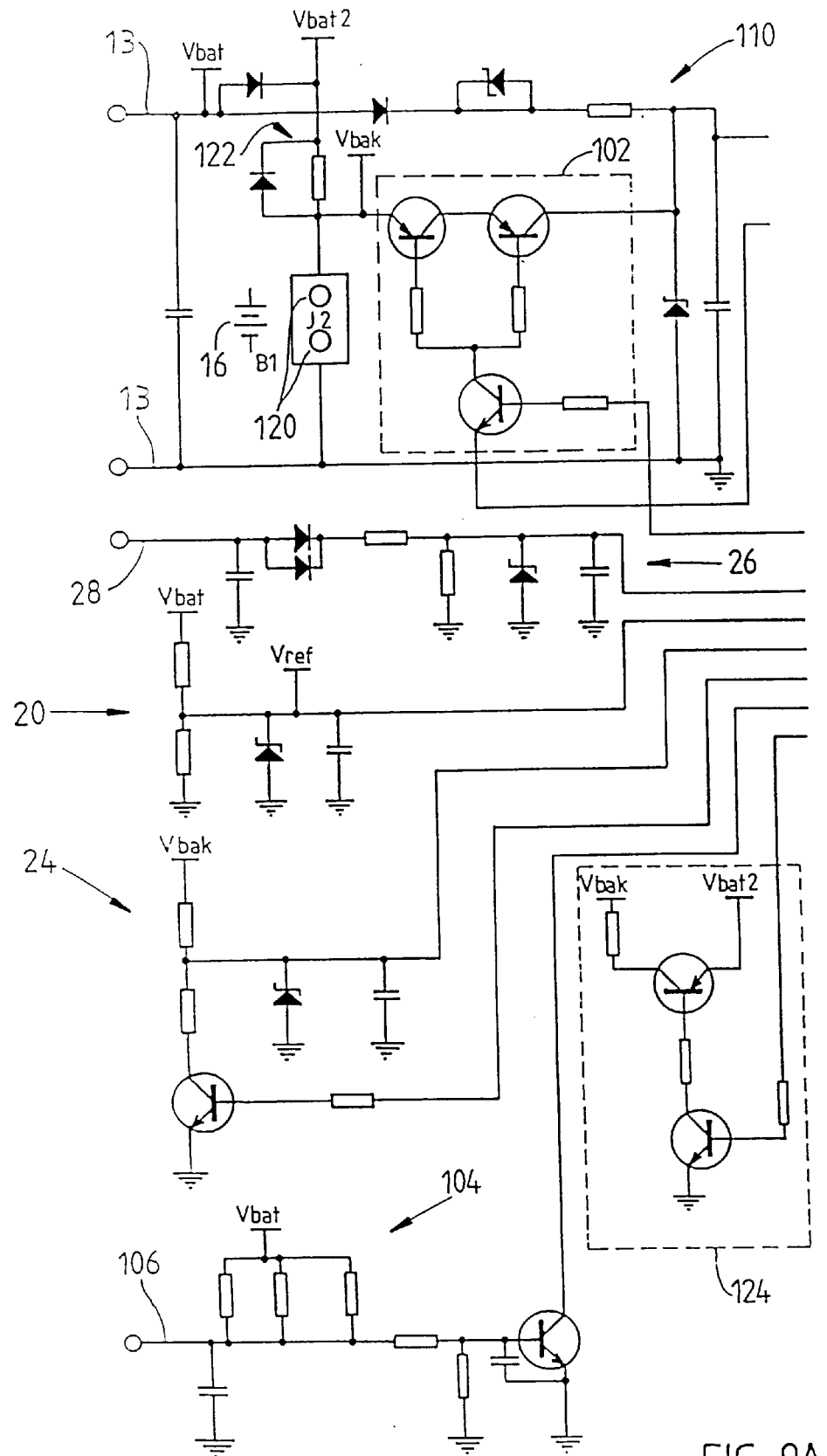
Figure 9B:
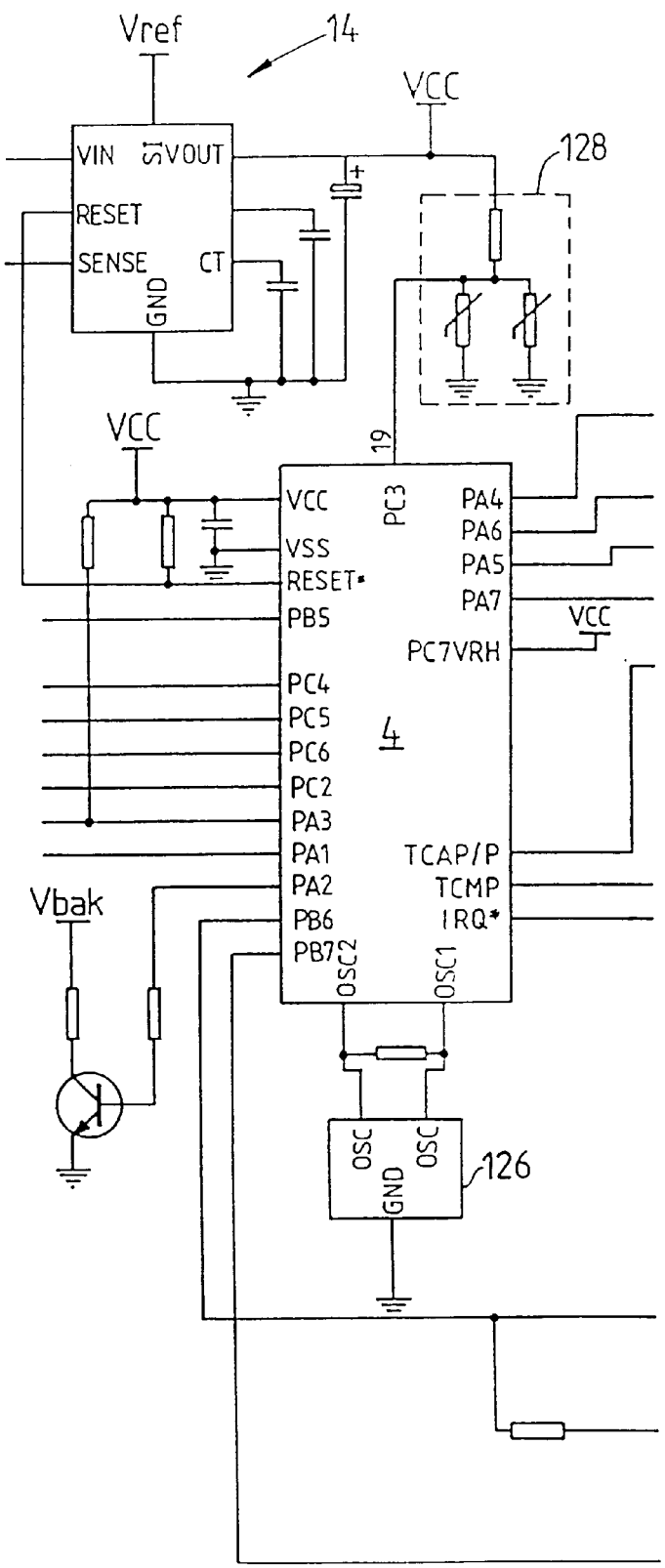
Figure 9C:
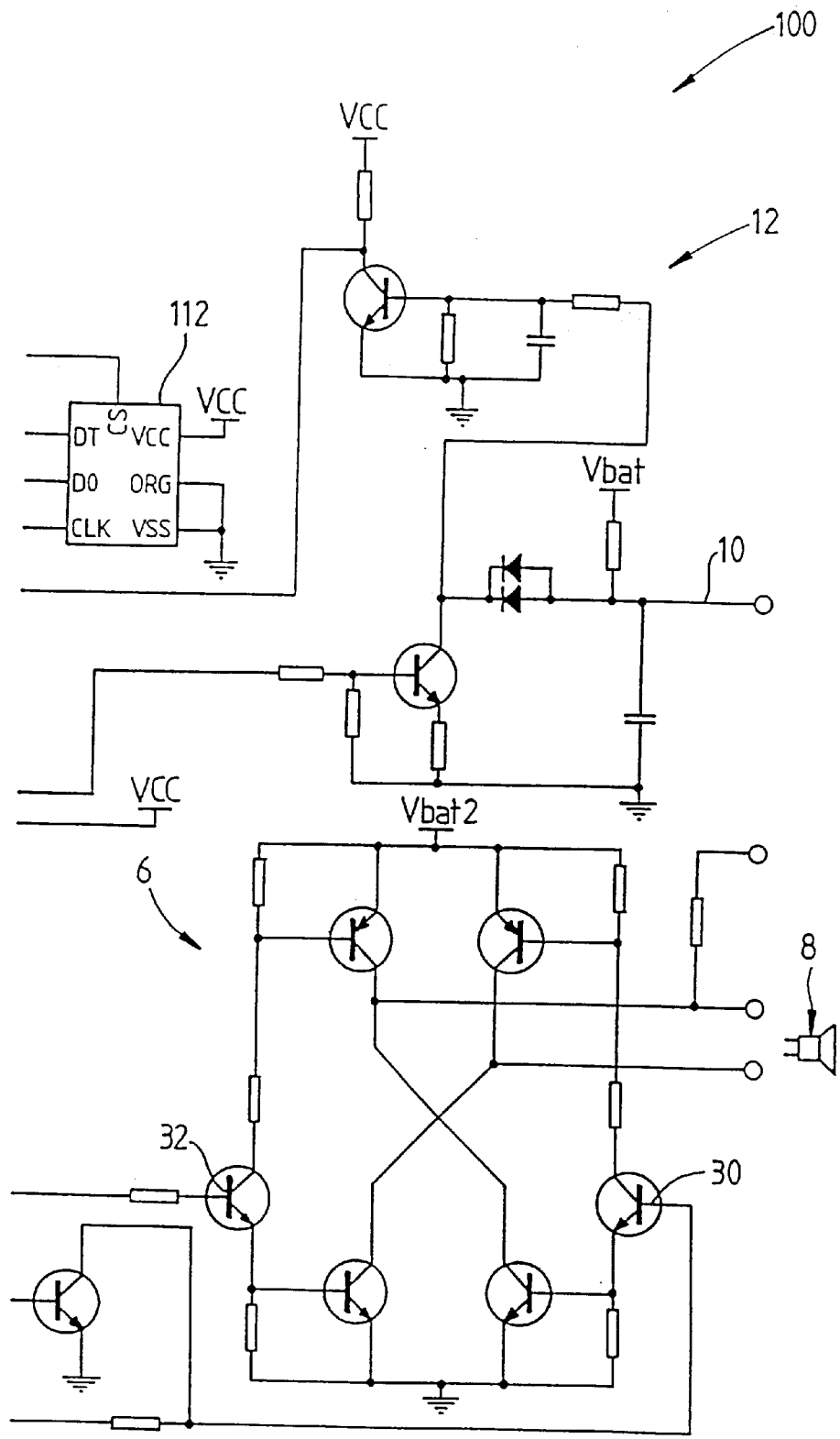

The backup battery 16 is connected to two junction points 120, as shown in FIG. 9, with the backup battery enable circuit 102 including three transistors and respective bias resistors configured to disable the supply of input power to the voltage regulator 14 on receipt of instructions from the CPU 4. The trickle charge circuit 122 is located between the junction points 120 and the battery input 13. The fast charging circuit 124 includes a transistor and resistor arrangement shown next to the backup battery monitor circuit 24 and the horn interface circuit 104 in FIG. 9. The voltage regulator 14 and the memory 112 are standard products, such as that produced by S.G.S. Thompsons with product numbers L49490N and ST93C06CM3, respectively. The CPU 4 is a standard microprocessor, such as the Motorola MC68HC05P6 microprocessor, which obtains its clocking signals from a resonator 126. The circuit diagram includes a temperature sensor circuit 128 which adjusts the level of the monitored supply voltage $V_{CC}$ that is passed to the CPU 4. The monitored voltage level is adjusted to prevent the CPU 4 from instructing the fast charging circuit 124 to be activated when the sensor temperature is very high or very low, for example above 65° C. and below 0° C.

The siren unit 2 is particularly advantageous as it can be connected to a number of vehicle security control units and can be simply configured using the dip switches 44 or serial interface 12 so as to emit a siren signal of a selected frequency, duration and volume. The siren unit 2 also provides a facility for complete configuration control by a connected vehicle security control unit to which the status of the siren unit 2 can be reported as requested. The siren configuration can be based on country or car codes included in the vehicle security control unit or provided to it by other electronic components of the vehicle. Also if the vehicle includes a positioning system, then siren configuration can be selected based on vehicle position thereby allowing continual compliance with siren regulations set by local authorities. The siren unit is also able to detect unauthorised disconnection and discriminate between power disconnection and slow power supply deterioration.

The claims defining the invention are as follows:

1. A siren unit including:
   control means for controlling activation of a siren sound emitting means at a selected frequency based on a coded frequency control signal;
   input means for receiving said coded frequency control signal from a vehicle security control unit and providing it to said control means; and,
   power sensor means which detects disconnection of a power supply to said unit and discriminates between said disconnection and gradual deterioration of said power supply.

2. A siren unit as claimed in claim 1, wherein said control means stores a predetermined set of frequency patterns and selects one of said patterns on the basis of said frequency control signal, the selected pattern thereby selecting said frequency of activation of said siren sound emitting means.

3. A siren unit as claimed in claim 2, wherein said selected frequency is varied over time by varying the frequency of the activation signal for said siren sound emitting means according to said selected pattern.

4. A siren unit as claimed in claim 1, wherein said input means further provides a volume control signal and a duration control signal, and said control means controls activation of said siren sound emitting means at a selected volume for a selected duration based on said volume and duration control signals.

5. A siren unit as claimed in claim 1, including battery means for supplying power to said unit on disconnection of said power supply, said power sensor means causing said control means to activate said siren sound emitting device on detecting said disconnection.

6. A siren unit as claimed in claim 5, including battery charging means for charging said battery means with a trickle current when an ignition power line is in one state and charging said battery means with a relatively fast charging current when said ignition power line is in another state.

7. A siren unit as claimed in claim 5, wherein said control means is adapted to perform a diagnostic test on at least one part of said unit and issue a reporting signal to report the results of said test.

8. A siren unit as claimed in claim 7, including monitoring means for performing said diagnostic test on said battery means and causing said reporting signal to indicate the power of said battery means is below a predetermined level when said results of said test determine said power is below said predetermined level.

9. A siren unit as claimed in claim 8, wherein said control means conducts said tests in response to receiving a diagnostic test request signal.

10. A siren unit as claimed in claim 1, wherein said siren sound emitting means is activated in response to a trigger signal being received by said input means.

11. A siren unit as claimed in claim 10, wherein said trigger signal is a plurality of predetermined data bits.

12. A siren unit as claimed in claim 10, wherein, in use, at least one command signal is provided to said input means and said trigger signal is any signal received by said input means in the absence of said at least one command signal.

13. A siren unit as claimed in claim 1, wherein said input means is connected to a vehicle security unit and said power supply comprises a vehicle battery.

14. A siren unit as claimed in claim 5, wherein said control means includes a microprocessor and an audio driver and said input means includes a data interface.

15. A siren unit as claimed in claim 1, wherein said control means includes a microprocessor and an audio driver and said input means includes a trigger input and a set of configuration switches.

16. A siren unit as claimed in claim 1, wherein said control means includes a microprocessor and an audio driver and said input means includes a trigger input and memory means storing configuration data.

17. A siren unit as claimed in claim 4, wherein said siren sound emitting means is activated in response to a trigger signal being received by said input means, and said siren sound emitting means ceases to be activated on expiry of said selected duration or upon the absence of said trigger signal at said input means, whichever occurs first.

18. A siren unit including:
control means for controlling activation of a siren sound emitting means at a selected frequency based on a coded frequency control signal;
input means for receiving said coded frequency control signal from a vehicle security control unit and providing it to said control means; and,
wherein said input means is connected to a vehicle security unit which provides said frequency control signal on the basis of positional information concerning a vehicle in which the units are installed.

19. A siren unit including:
control means for controlling activation of a siren sound emitting means at a selected frequency based on a coded frequency control signal;
input means for receiving said coded frequency control signal from a vehicle security control unit and providing it to said control means; and,
wherein said input means is connected to a vehicle security unit which provides said frequency control signal on the basis of regional information associated with a vehicle in which the units are installed.

20. A siren unit as claimed in claim 1, wherein said input means includes horn means for providing said frequency control signal to said control means so as to cause said control means to activate said siren sound emitting means at a selected frequency which corresponds to the frequency of a vehicle horn.

21. A siren unit as claimed in claim 5, including disabling means for preventing activation of said siren sound emitting device on said disconnection of said power supply.

22. A siren unit including:
control means for controlling activation of a siren sound emitting means based on a data communications packet, said data communications packet containing information about the frequency pattern of a sound to be emitted;
input means for receiving said data communications packet from a vehicle security control unit and providing it to said control means; and
wherein said control means causes activation of said sound emitting means when said data communications packet is not received by said input means.

23. A siren unit including:
control means for controlling activation of a siren sound emitting means at a selected frequency based on a coded frequency control signal;
input means for receiving said coded frequency control signal from a vehicle security control unit and providing it to said control means;
wherein said siren sound emitting means is activated in response to a trigger signal being received by said input means; and
wherein, in use, at least one command signal is provided to said input means and said trigger signal is any signal received by said input means in the absence of said at least one command signal.

* * * * *